May 12, 1931.  C. A. BUTCHER  1,804,591
SYNCHRONOUS MACHINE STARTING SYSTEM
Filed Dec. 31, 1927
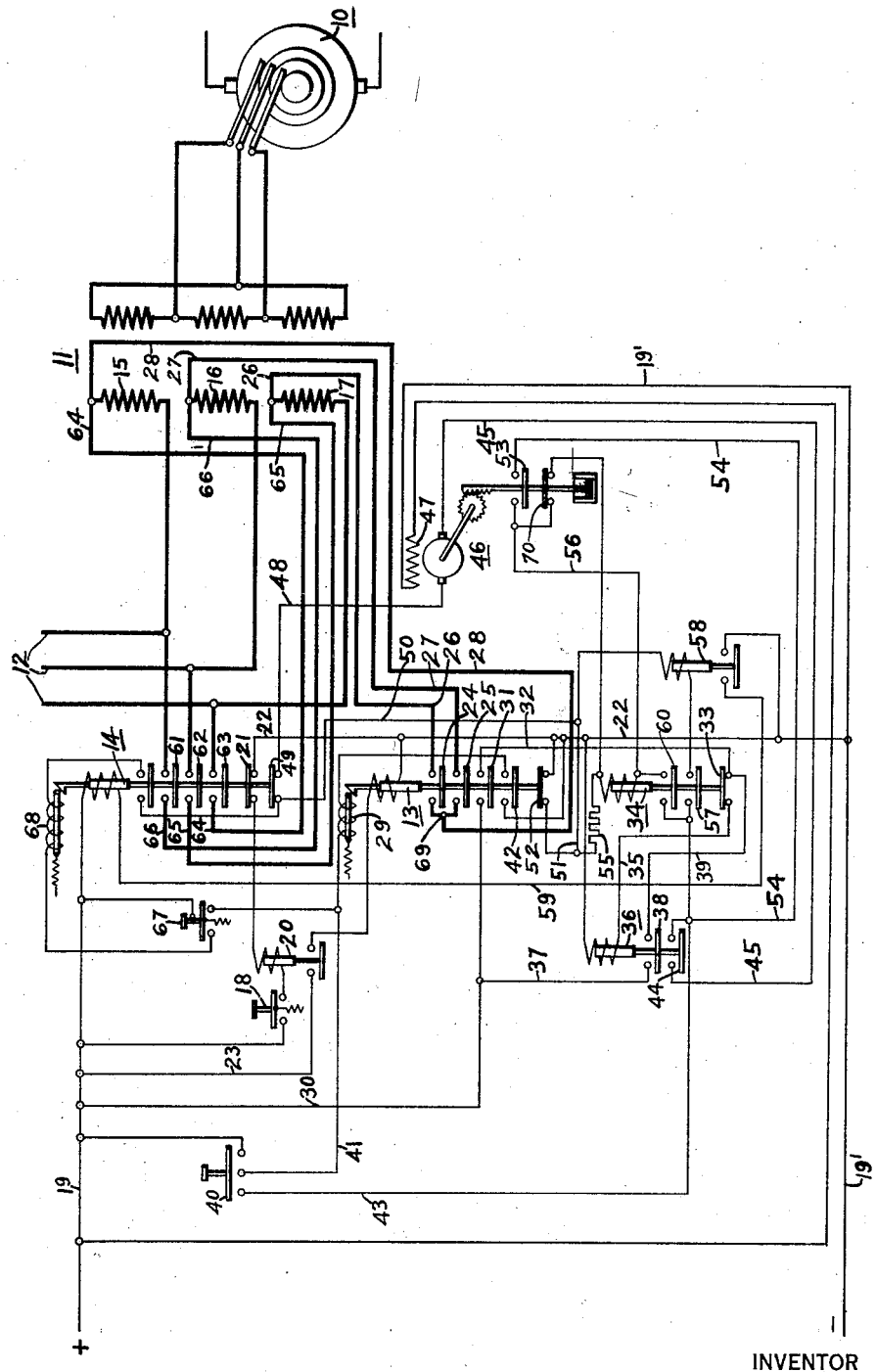
INVENTOR
Charles A. Butcher
BY
ATTORNEY Patented May 12, 1931

1,804,591

UNITED STATES PATENT OFFICE

CHARLES A. BUTCHER, OF FOREST HILLS, PENNSYLVANIA, ASSIGNOR TO WESTING-HOUSE ELECTRIC & MANUFACTURING COMPANY, A CORPORATION OF PENNSYLVANIA

SYNCHRONOUS MACHINE STARTING SYSTEM

Application filed December 31, 1927. Serial No. 243,881.

My invention relates generally to starting systems for synchronous machines and particularly to a means for permitting a definite period of time to elapse between the interruption of the starting connections and the completion of the running connections for a synchronous machine.

In the operation of synchronous converters which are started from the alternating-current side, it is necessary that a voltage of lesser magnitude be applied for starting the machine than is employed in running it continuously. This is ordinarily accomplished through the use of transformers, either by tap changing means on the secondary windings or by star-delta connection of the primary windings. When the latter method is adopted, it will be found that the running voltage is 30° out of phase with the starting voltage and, for this reason, it is necessary to allow the machine to coast after the interruption of the star connections to permit the armature to rotate through an angle equal to the phase displacement before the closure of the delta connections. The period of time which elapses between the interruption of the star connections and the completion of the delta connections is not of great importance when converters are operated on 60 cycle current but, if not definitely limited when 25-cycle current systems are utilized, the machines may be subjected to severe shocks upon the application of a delta voltage which may result in the machines dropping out of synchronism or stopping.

The object of the invention is to provide a means for varying the voltage applied to a synchronous converter upon starting.

Another object of the invention is to provide for starting a synchronous machine with star connections and changing to delta connections when the machine is operating and without throwing it out of synchronism.

A more specific object of the invention is to provide for the lapse of a definite period of time between the opening of the starting switches of a star-connected converter and the closure of the switches for establishing the running connections.

Other objects of the invention will be apparent when the following description is considered.

For a complete understanding of the invention and the operation of its parts, the following description should be read in conjunction with the accompanying diagram showing a system of starting and operating a synchronous converter connected in accordance with my invention.

The synchronous converter 10 has its alternating-current windings permanently connected to the secondary windings of a transformer bank 11. The primary windings of the transformers which constitute the transformer bank 11 are connected to a source of alternating-current supply 12 and to each other through the switches 13 and 14.

Since the application of the full line voltage on the synchronous converter while at a standstill would produce very undesirable results, provision is made whereby voltage of approximately 58% of the normal running voltage may be applied to the synchronous converter 10 through connecting the primary windings 15, 16 and 17 of the transformer bank 11, in star, through the switch 13 so that the line voltage on each phase is divided across two of the primary coils. When the synchronous converter has attained its synchronous speed, the star connection of the transformers is interrupted and the primary windings 15, 16 and 17 are connected in delta through the switch 14, thus applying a full line voltage to each primary coil of the transformer bank 11. It is, however, well known to those skilled in the art that, in changing from star to delta connections of transformers, a phase displacement of 30 electrical degrees in the coil voltages of the transformers occurs so that it is necessary to allow the rotor of the converter to drift for a period of time in order that it be displaced from its original position by an amount corresponding to the phase displacement in the supplied voltage. Since the synchronous speed of the converter is known and the angle of phase displacement of the starting and running voltages is also known, the period of time which must elapse so that the machine will be in synchronism with the power supplied by the delta connections may be calculated readily and a relay operating under the calculated time delay employed to close the switch 14 at the proper time.

When it is desired to start the synchronous converter 10, the push-button switch 18 is actuated and a circuit is established which extends from the positive side 19 of the control supply line, through the push-button switch 18, the actuating coil of relay 20, interlock 21 of switch 14 and conductor 22, to the negatively energized control supply line conductor 19' and the relay 20 is actuated closed.

Upon the closure of relay 20, a circuit is completed from the positively energized control supply-line conductor 19, through conductor 23, the contact members of relay 20, the actuating coil of switch 13 to conductor 22 and the negatively energized supply-line conductor 19', thereby actuating switch 13 to its closed position.

The closure of the switch 13 effects the star connection of the transformers by the closure of interlocks 24 and 25 which connect the conductors 26, 27 and 28 to a common point 69, thereby connecting one side of each of the primary coils 15, 16 and 17 together. Since the other side of each of these primary coils 15, 16 and 17 is already connected to the source of alternating-current supply 12, as shown in the figure, the star connection is completed. When the switch 13 is closed, the latch 29 is mechanically actuated to retain the switch 13 in its closed position, and the push-button switch 18, utilized in actuating the switch 13, may be released without allowing the switch 13 to open.

Another circuit is established upon the closure of the switch 13 which may be traced from the positively energized control supply-line conductor 19, through conductor 30, the interlock 31 of switch 13, conductor 32, interlock 33 of relay 34, conductor 35, the actuating coil of relay 36, to conductor 22 and the negatively energized control supply-line conductor 19', thereby actuating the relay 36 to its closed position.

Since there exists but one actuating circuit for the relay 36, the switch 13 must be in its closed position before the relay 36 is energized. Thus the relay 36 operates to prevent the closure of the switch 14 before the switch 13 has closed and then opened as described hereinafter. When the relay 36 is closed, a holding circuit is established which may be traced from the energized conductor 30 through conductor 37, interlock 38 of relay 36, conductor 39, interlock 33 of relay 34, conductor 35, the coil of relay 36 and conductor 22, to the negatively energized supply line conductor 19'.

When the synchronous converter 10 has attained its synchronous speed, the push-button switch 40 may be actuated to establish a circuit from the positively energized control supply-line conductor 19, through the push-button switch 40, conductor 41, the trip coil of the mechanical latching device 29, of switch 13, the closed interlock 42 of switch 13 and the conductor 22, to the negatively energized control supply-line conductor 19'. Therefore, when the switch 13 is released, the star connections of the transformers and the circuit through the tripping coil of the mechanical latching device 29 are interrupted.

Another circuit is established through the push-button switch 40 which extends from the positively energized control supply-line conductor 19, through the push-button switch 40, conductor 43, interlock 44 of the relay 36, (in its closed position) conductor 45, the armature of relay 46 (which has its field 47 connected directly across the control supply line 19—19') conductor 48, interlock 49 of the switch 14, conductor 50, conductor 51, interlock 52 of the switch 13 and conductor 22 to the negatively energized control supply-line conductor 19', thereby setting the relay 46 into operation.

The relay 46 requires a definite period of time for its operation before its contact members reach their closed position, and it is through the operation of this relay that the desired delay is obtained between the operation of the switches 13 and 14. After relay 46 has been operating for the desired period of time, interlock 53 assumes its closed position, and a circuit is completed which may be traced from the energized conductor 43 through conductor 54, interlock 53 of relay 46, conductor 56, the actuating coil of relay 34, resistor 55, interlock 52 of switch 13, and conductor 22 to the negatively energized control supply line conductor 19', thereby closing the relay 34.

Upon the closure of relay 34, a circuit is established which may be traced from the energized conductor 43 through interlock 57 of relay 34, the actuating coil of relay 58, conductor 51, the interlock 52 of switch 13 to conductor 22 and the negatively energized control supply-line conductor 19'. Therefore, the relay 58 is actuated to its closed position, and a circuit is established from the energized conductor 22 through the contact members of relay 58, conductor 59 and the actuating coil of switch 14 to the positively energized control supply-line conductor 19 and the switch 14 is closed.

A holding circuit for the switch 34 is established through one of its own interlocks 60, and the holding circuit for the relay 36 is interrupted through the actuation of interlock 33 of relay 34, thereby releasing relay 36 and interrupting the circuit to the relay 46 through the actuation of interlock 44.

The circuit to the coil of relay 46 is interrupted upon the release of relay 36 so that the armature of relay 46 is deenergized and it begins backward travel, for which a definite period of time is required, to close the interlock 70. The interlock 70 short circuits the operating coil of relay 34 so that it is released to its open position, breaking the circuit to the operating coil of relay 58, so that the actuating influence is removed from the switch 14. If the switch 14 does not close before the relay 46 returns to its lower position, the switch 13 must again be closed so that the relays 36, 46, 34 and 58 may again be actuated as described above.

The switch 14, having been actuated to its closed position, the primary windings 15, 16, and 17 of the transformers are thus connected in delta, and the running voltage is applied to the synchronous converter 10. The delta connection of the primary windings is established through the interlocks 61, 62 and 63 of switch 14, in conjunction with the conductors 64, 65 and 66 which connect one terminal of the primary winding 15 to the opposite terminal of the primary winding 16. The remaining terminal of primary winding 16 is connected to an opposite terminal of the primary winding 17, the remaining terminal of primary winding 17 being connected to the remaining terminal of primary winding 15, and the connection to the alternating-current supply-line conductors is made to each of the respective primary coils to complete the delta connection. The synchronous converter 10 is thus connected to the full running voltage by the delta connection of the transformers.

When it is desired to stop the operation of the synchronous converter 10, whether it be operating on its starting or its running voltage, a push-button switch 67 may be actuated which completes a circuit from the positively energized control supply-line conductor 19 to the trip coils of the mechanical latches 29 and 68 for the switches 13 and 14, respectively. However, it will be seen that a circuit may be completed through but one of these trip coils since the tripping circuits must be completed through an interlock on the respective switches, thence to the negatively energized control supply-line conductor 19'.

Since the embodiment hereinbefore set forth may be modified in various ways without departing from the spirit and scope of the invention, this embodiment should be construed as descriptive and not in a limiting sense.

I claim as my invention:

1. The combination with a source of power of a synchronous machine and a plurality of transformers having primary and secondary windings, said primary windings disposed to be connected in star relation for starting the synchronous machine, and in delta relation for the running condition of the synchronous machine, means for changing from star to delta connections and a time-element relay for causing a predetermined period of time to elapse between the interruption of the star connection and the completion of the delta connection of the transformers.

2. In a synchronous-machine-starting system, in combination, a synchronous machine provided with primary windings, a plurality of transformers for supplying power to the machine at different voltages, said voltages being displaced a predetermined number of degrees from one voltage to another, switching means for effecting a switching operation from one voltage to another and a time-element relay for controlling the operation of said switching means to provide a predetermined time lapse between the switching operations, said relay being disposed to automatically render said switching means inoperative subsequent to their failure to operate at the end of said predetermined time lapse.

3. In a synchronous machine starting system, in combination, a synchronous machine, a plurality of transformers for supplying power to the machine at different voltages, said voltages being displaced a predetermined number of degrees in phase relation, means for effecting a switching operation from one voltage to another, and a time-element relay for controlling the operation of said switching means, said relay being disposed to establish running connections within a predetermined time interval after the interruption of the starting connections to synchronize the phase position of the machine and the applied voltage and to prevent the establishment of a running connection if the connection is not established at the proper time thereby to prevent the application of a running voltage which is out of phase with the machine.

4. In a starting system for synchronous machines, in combination, a synchronous machine, a source of power, a plurality of transformers having primary and secondary windings, said secondary windings being connected to the synchronous machine and the primaries of the transformers to the power source in a star-circuit relation to provide a starting voltage, a switch operable to connect said primary windings in delta-circuit relation to provide a running voltage, and a time-element relay for controlling the switching operation from starting to running voltage, said relay being responsive to the opening of the starting switch thereby to introduce a predetermined time delay in the closing operation of the running switch to bring the relative phase positions of the running voltage and the machine together.

5. In a control system, in combination, a synchronous machine provided with an armature winding, a source of power for the machine, a plurality of transformers having primary and secondary windings, said secondary windings being connected to the armature winding, means for connecting the primary windings of the transformers in star and in delta-circuit relations for impressing different voltages upon the armature windings of the synchronous machine, and a time-element relay for controlling the means for establishing a delta connection, said time-element relay being responsive to the opening of the star-circuit connecting means for interposing a time interval between the opening of the star connection and the closing of the delta connection to permit the armature of the machine to drop back in phase position to correspond to that of the voltage supplied through the delta circuit connections.

6. In a starting system for rotary converters, in combination, a rotary converter provided with a polyphase armature winding, a polyphase source of power, a plurality of single-phase transformers provided with primary and secondary windings, said secondary windings being connected for supplying polyphase power to the armature of the rotary converter, means operable to connect the transformer primary windings to the power source in star-circuit relation to provide a predetermined starting voltage, means operable to disconnect the star connection after the converter has reached synchronous speed, and time-delay means operable in response to said disconnecting means for connecting the transformers to the power supply in delta-circuit relation to impress a running voltage of greater magnitude upon the converter, said time-delay means being disposed to prevent the establishment of the delta connection if the said connection is not effected within a predetermined time thereby to prevent a voltage from being applied to the armature windings of the converter which is not in the same relative phase position as the phase position of the armature.

In testimony whereof, I have hereunto subscribed my name this 28th day of December, 1927.

CHARLES A. BUTCHER.